Aug. 25, 1925.
J. W. PUTERBAUGH
1,550,844
APPLIANCE FOR FRUIT JUICE EXTRACTING MACHINERY
Filed Feb. 24, 1922
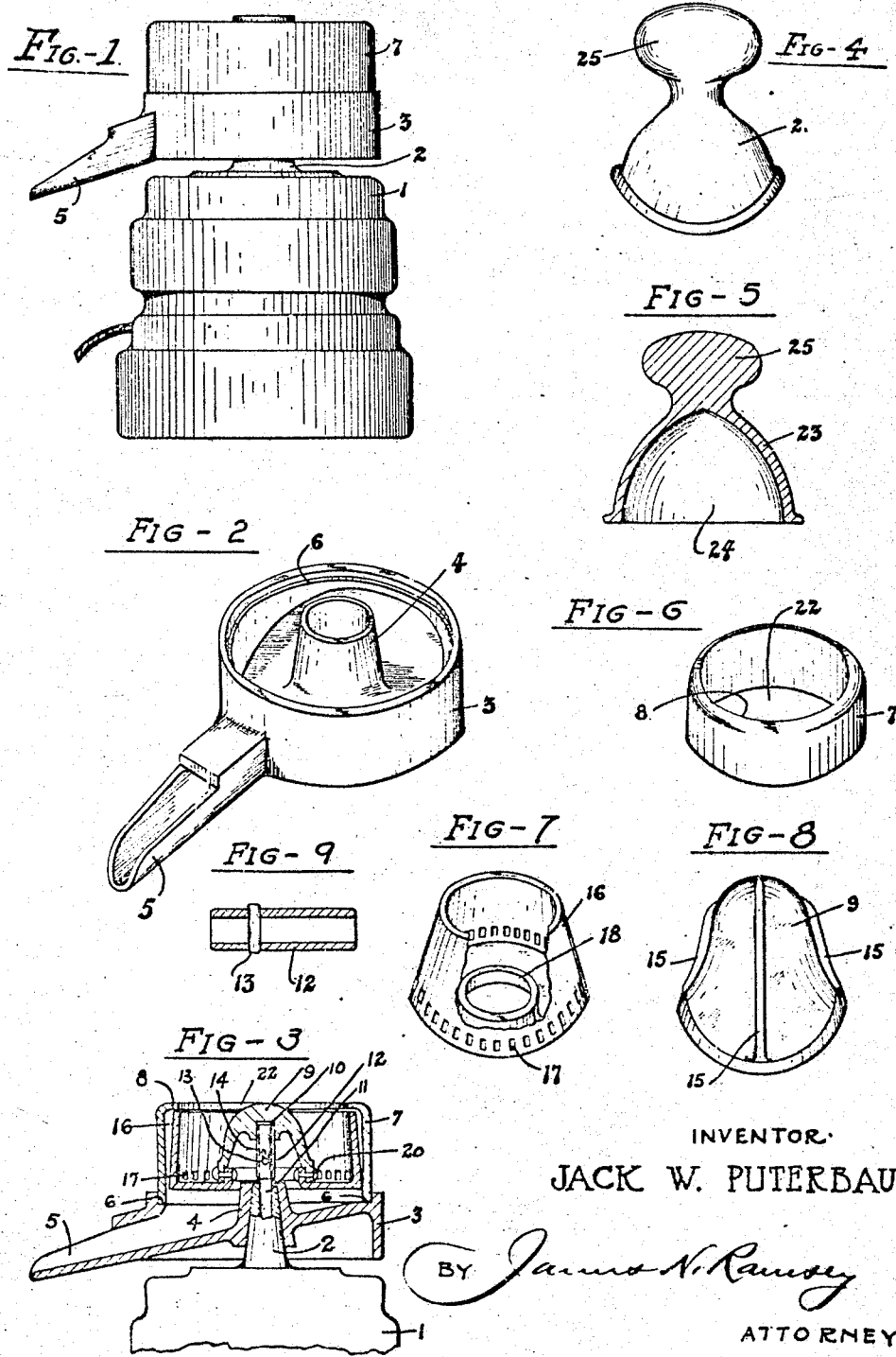
INVENTOR.
JACK W. PUTERBAUGH.
BY James N. Ramsey
ATTORNEY.

Patented Aug. 25, 1925.

1,550,844

UNITED STATES PATENT OFFICE.

JACK W. PUTERBAUGH, OF CINCINNATI, OHIO.

APPLIANCE FOR FRUIT-JUICE-EXTRACTING MACHINERY.

Application filed February 24, 1922. Serial No. 538,962.

*To all whom it may concern:*

Be it known that I, JACK W. PUTERBAUGH, a citizen of the United States, residing at Cincinnati, in the county of Hamilton and State of Ohio, have invented certain new and useful Appliances for Fruit-Juice-Extracting Machinery, of which the following is a specification.

My invention relates to means for holding oranges, lemons or other citrous fruits while the juice is being extracted therefrom and to means for separating the seeds and pulverizing the pulp during the process of extracting the juices.

The objects of my invention are to provide simple, economical, conveniently operated and efficient sanitary means for holding the fruit while the juices and seeds are being extracted and means for separating the seeds from the juice.

My invention consists in the combination and arrangement of parts and in the details of construction as set forth and claimed.

In the drawings:

Fig. 1 is a side elevation of a machine embodying my invention;

Fig. 2 is a perspective view of the juice conveyor;

Fig. 3 is a vertical section of the juice conveyor, container, strainer and extracting reamer mounted upon a suitable motor;

Fig. 4 is a side elevation of the flexible fruit holder;

Fig. 5 is a vertical section of the same;

Fig. 6 is a perspective view of the container;

Fig. 7 is a perspective view partly broken away of the strainer;

Fig. 8 is a perspective view of the extracting reamer; and

Fig. 9 is a section of the tube connecting the extracting reamer and operating mechanism.

I have illustrated my invention as applied to a base comprising an electric motor 1, provided with hollow tapered support 2 on which is mounted juice conveyor 3 having a tapered sleeve 4 which receives said support and forms wedging holding engagement therewith. The conveyor has a discharge spout 5 and is preferably provided with a ledge 6 adapted to support tubular container 7 having at its upper end an inturned flange 8. An extracting reamer 9 having holding socket 10 is detachably connected to the driving spindle 11 of motor 1 by connecting tube 12 having pin 13 engaging slot 14 in the end of driving spindle 11 and is provided upon its upper surface with crushing or macerating ribs 15.

My invention comprises open top strainer 16 having a series of perforations 17 in its side wall near the bottom and is provided with an upwardly inturned flange 18 in its bottom adapted to fit within the lower edge of extracting reamer 9 to which it is secured by rivets 20 or other suitable fastening means.

The strainer and extracting reamer as thus secured together operate as a single unit and are encased in tubular container 7 having inturned flange 8 forming the wall of central opening 22. The lower edge of this container is adapted to detachably seat upon ledge 6 of juice conveyor 3.

The fruit holder 23 is provided with a socket or concavity 24 of flexible material such as rubber or other spring material that will yield to the various shapes and sizes of fruit (such as a half orange or lemon) to be held while in process of extracting the juice and is provided with a suitable handle 25 to be grasped by the hand of the operator. The holder is adapted and intended to provide self adjusting sanitary means for holding various sizes and shapes of fruit operated upon and to prevent the hands from coming into contact with the fruit juices, thereby making the equipment entirely sanitary, which is not the case where the fruit is held in the hands while the juices are being extracted, in which case the juices are sprayed on the hands which are not always clean.

The machine as illustrated in Figs. 1 and 3 is ready for the extracting operation. When the current is turned on the spindle will rotate and cause the extracting reamer and strainer to revolve. The fruit is cut in halves and grasped by the holder with the cut side down which is placed upon the reamer and with downward pressure thereon, the seeds and pulp are reamed out and caused to drop down and be thrown by centrifugal force outwardly against the side wall of the strainer, the juice and fine pulp running out through the perforations and discharging through the spout into a suitable juice receptacle. The pulp in this action will be broken up and pulverized so as to utilize a greater quantity of the pulp along with the juice than otherwise.

The seeds will accumulate in the bottom of the strainer and these can be readily removed by lifting the container and strainer out and discharging the same therefrom through the top. The strainer and other parts can be readily cleaned by rinsing.

By means of my invention I am enabled to extract the juices and separate the seeds therefrom in a sanitary manner with greater rapidity and more thoroughly than otherwise.

It will be seen that by the use of the flexible rubber fruit holder which is adapted to conform to the size and shape of the fruit which it holds when the fruit is placed down upon the reamer by the weight of the hand of the operator, the meat or pulp of the fruit will be crushed into fine particles or broken up into shreds in such a manner that these particles will be extracted along with the juice thereby producing a beverage possessing substantially all of the food values of the fruit. In other words the combined action of the flexible holder and reamer serves to crush the innumerable cells of the fruit thereby releasing all of the fluids and producing juices having their natural, delicious flavors.

One of the advantages of my invention in addition to being sanitary is the fact that danger to the hand is avoided by placing the holder upon the fruit within the machine instead of placing the hand therein which is in danger in coming in contact with the moving parts of the machinery.

The fruit juice extracting machinery as shown and described is set forth merely for the purpose of showing the application of my improvements thereto. While I have shown and described a particular construction of the holder and separator which constitute my invention it will be understood that variations may be made therein without departing from the scope or spirit of my invention as set forth in the claims.

What I claim as new and desire to secure by Letters Patent is:

1. In appliances for fruit juice extracting machinery, a fruit juice conveyor, an open top container mounted thereon, a cup-shaped strainer having lateral perforations therein near its bottom, and rotatably mounted in said container, an extracting reamer mounted in said strainer and adapted to rotate therewith whereby the contents of the fruit may be broken up and the fine pulp and juices be discharged through the strainer while it is being rotated and whereby the coarse pulp and seeds may be retained in said strainer, substantially as set forth and for the purposes specified.

2. In appliances for fruit juice extracting machinery, a fruit juice conveyor, an open top container detachably mounted thereon, a cup shaped strainer detachably and rotatably mounted within said container and having lateral perforations therein, an extracting reamer mounted in said strainer and adapted to rotate therewith whereby the contents of the fruit may be broken up and discharged through the strainer as it is being rotated, substantially as set forth and for the purposes specified.

3. In fruit juice separating means, a rotatably mounted cup-shaped strainer having perforations in its side walls, a fruit reamer rotatably mounted in said strainer, means for rotating said reamer to break up the fruit contents, and means for rotating said strainer to produce centrifugal motion whereby the juices and fine pulp will drain through said strainer and the seeds and coarse pulp will be retained in said strainer.

4. In a fruit juice extractor of the character described, a conveyor comprising a cup having a spout leading therefrom and having an upwardly extending centrally disposed tapered sleeve integral with the bottom thereof, a cup shaped strainer having lateral perforations therein and having an opening in the bottom thereof, a conical reamer mounted in said cup shaped strainer and adapted to receive a portion of said fruit, and means for rotating said reamer and said strainer whereby the pulp, juices and seeds are extracted from said fruit, and the juices and fine pulp are discharged through said spout, and the coarse pulp and seeds are retained within said strainer.

5. A machine for extracting the juice of fruit, comprising, a stationary casing, an extractor bulb rotatably mounted within the casing, a strainer associated with the extractor bulb, and mechanism for rotating the strainer for discharging the juice from the contents of the strainer into the stationary casing by the action of centrifugal force.

6. A machine for extracting the juice of fruit comprising, a stationary casing, a shaft rotatably mounted within the casing, an extractor bulb mounted upon the shaft and positioned within the casing, a strainer rotatable with the said shaft, a retaining wall upon the strainer surrounding said bulb adapted to retain the pulp of the fruit against the action of centrifugal force, and said strainer having perforations formed therein through which the juice may be forced from the strainer into the casing when the strainer is rapidly rotated.

7. A machine for extracting the juice of fruit comprising, a stationary casing, a shaft rotatably mounted within said casing, an extractor bulb mounted upon the shaft and positioned within the casing, a strainer having perforations formed therein, said strainer associated with said extractor bulb and rotatable therewith, said bulb and said strainer being readily detachable from said shaft and removable from the casing, said strainer having an annular upstanding wall adapted to retain the pulp of the fruit against the action of centrifugal force, and means for rapidly rotating the strainer for extracting the juice from the pulp in the strainer and discharging it into the casing.

8. A machine for extracting the juice of fruit comprising, a stationary casing, an extractor bulb rotatably mounted within the casing, a bowl shaped receptacle associated with said bulb, said receptacle having an upstanding annular wall adapted to retain the pulp of the fruit when rapidly rotated, said receptacle having radial slots formed through said wall through which the juice is adapted to be discharged into the casing, and mechanism for rotating said receptacle.

JACK W. PUTERBAUGH.